(12) United States Patent
Berger et al.

(10) Patent No.: US 7,210,100 B2
(45) Date of Patent: Apr. 24, 2007

(54) CONFIGURABLE TRANSFORMATION OF ELECTRONIC DOCUMENTS

(75) Inventors: Adam L. Berger, Pittsburgh, PA (US); Richard D. Romero, Pittsburgh, PA (US); Gregory C. Schohn, Durham, NC (US); Clark W. Slater, Wexford, PA (US)

(73) Assignee: Eizel Technologies, Inc., Pittsburgh, PA (US)

( * ) Notice: Subject to any disclaimer, the term of this patent is extended or adjusted under 35 U.S.C. 154(b) by 691 days.

(21) Appl. No.: 09/745,290

(22) Filed: Dec. 20, 2000

(65) Prior Publication Data

US 2002/0062325 A1 May 23, 2002

Related U.S. Application Data

(60) Provisional application No. 60/238,424, filed on Oct. 10, 2000, provisional application No. 60/235,551, filed on Sep. 27, 2000.

(51) Int. Cl.
*G06F 15/00* (2006.01)

(52) U.S. Cl. .................. 715/518; 715/500; 715/731

(58) Field of Classification Search ............... 715/511, 715/513, 515, 523, 530, 531, 518
See application file for complete search history.

(56) References Cited

U.S. PATENT DOCUMENTS

| 1,261,167 | A |   | 4/1918  | Russell |
| 1,435,663 | A |   | 11/1922 | Odell |
| 5,608,874 | A |   | 3/1997  | Ogawa et al. |
| 5,625,781 | A |   | 4/1997  | Cline et al. |
| 5,704,029 | A |   | 12/1997 | Wright, Jr. |
| 5,727,159 | A | * | 3/1998  | Kikinis ................. 709/246 |
| 5,742,668 | A |   | 4/1998  | Pepe et al. |
| 5,742,905 | A |   | 4/1998  | Pepe et al. |
| 5,809,415 | A |   | 9/1998  | Rossmann |
| 5,918,013 | A | * | 6/1999  | Mighdoll et al. ........... 709/217 |
| 6,012,074 | A |   | 1/2000  | Lucas et al. |
| 6,012,098 | A |   | 1/2000  | Bayeh et al. |
| 6,076,109 | A | * | 6/2000  | Kikinis ................. 709/228 |
| 6,081,815 | A |   | 6/2000  | Spitznagel et al. |
| 6,119,155 | A | * | 9/2000  | Rossmann et al. .......... 709/219 |
| 6,128,663 | A |   | 10/2000 | Thomas ................. 709/228 |
| 6,154,738 | A |   | 11/2000 | Call ............................. 707/4 |
| 6,161,140 | A |   | 12/2000 | Moriya |

(Continued)

OTHER PUBLICATIONS

Buyukkokten, et al. "Efficient Web Browsing on Handheld Devices Using Page and Form Summarization ", ACM Transactions on Information Systems, vol. 20, Issue 1, Jan. 2002, pp. 82-115.*

(Continued)

*Primary Examiner*—Heather R. Herndon
*Assistant Examiner*—Quoc Ai Tran
(74) *Attorney, Agent, or Firm*—Alston & Bird LLP

(57) ABSTRACT

A method that includes altering portions of a text of an original version of a digital document to produce a revised version of the digital document in which the text is shorter than the text of the original document, receiving over a communication channel a request for the digital document from a device connected to the channel, and transmitting the revised version over the communication channel in response to the request.

53 Claims, 13 Drawing Sheets

U.S. PATENT DOCUMENTS

| | | | |
|---|---|---|---|
| 6,167,441 A * | 12/2000 | Himmel | 709/217 |
| 6,178,461 B1 | 1/2001 | Chan et al. | |
| 6,226,675 B1 | 5/2001 | Meltzer et al. | 709/223 |
| 6,247,048 B1 * | 6/2001 | Greer et al. | 709/219 |
| 6,253,239 B1 | 6/2001 | Shklar et al. | |
| 6,278,449 B1 | 8/2001 | Sugiarto et al. | 345/334 |
| 6,279,014 B1 | 8/2001 | Schilit et al. | |
| 6,298,357 B1 | 10/2001 | Wexler et al. | |
| 6,300,947 B1 | 10/2001 | Kanevsky | |
| 6,311,197 B2 * | 10/2001 | Mighdoll et al. | 715/513 |
| 6,317,781 B1 | 11/2001 | De Boor et al. | 709/217 |
| 6,327,616 B1 | 12/2001 | Ohto et al. | |
| 6,336,124 B1 | 1/2002 | Alam et al. | |
| 6,347,340 B1 | 2/2002 | Coelho et al. | |
| 6,356,529 B1 | 3/2002 | Zarom | |
| 6,421,733 B1 * | 7/2002 | Tso et al. | 709/246 |
| 6,446,066 B1 | 9/2002 | Horowitz | |
| 6,457,030 B1 * | 9/2002 | Adams et al. | 715/523 |
| 6,473,730 B1 | 10/2002 | McKeown et al. | |
| 6,496,842 B1 | 12/2002 | Lyness | |
| 6,523,062 B1 | 2/2003 | Bridgman et al. | |
| 6,553,410 B2 * | 4/2003 | Kikinis | 709/218 |
| 6,581,094 B1 * | 6/2003 | Gao | 709/220 |
| 6,598,076 B1 | 7/2003 | Chang et al. | |
| 6,611,358 B1 * | 8/2003 | Narayanaswamy | 358/442 |
| 6,654,814 B1 * | 11/2003 | Britton et al. | 709/246 |
| 6,662,218 B2 * | 12/2003 | Mighdoll et al. | 709/219 |
| 6,671,853 B1 | 12/2003 | Burkett et al. | |
| 6,684,087 B1 * | 1/2004 | Yu et al. | 455/566 |
| 6,684,088 B1 * | 1/2004 | Halahmi | 455/566 |
| 6,715,129 B1 * | 3/2004 | Hind et al. | 715/513 |
| 6,721,785 B1 | 4/2004 | Raghunandan | |
| 6,738,951 B1 | 5/2004 | Weiss et al. | |
| 6,742,047 B1 * | 5/2004 | Tso | 709/246 |
| 6,763,388 B1 * | 7/2004 | Tsimelzon | 709/288 |
| 6,763,460 B1 * | 7/2004 | Hild et al. | 713/161 |
| 6,775,689 B1 | 8/2004 | Raghunandan | |
| 6,839,741 B1 | 1/2005 | Tsai | |
| 2002/0069223 A1 | 6/2002 | Goodisman et al. | |
| 2003/0018815 A1 | 1/2003 | Spicer et al. | |

OTHER PUBLICATIONS

Staffan Björk, Lars Erik Holmquist, Johan Redström, Ivan Bretan, Rolf Danielsson, Jussi Karlgren, Kristofer Franzén Nov. 1999 "WEST: a Web browser for small terminals" pp. 187-196.*

Wei-Ying Ma, Ilja Bedner, Grace Chang, Allan Kuchinsky, and HongJiang Zhang, *A Framework for Adaptive Content Delivery in Heterogeneous Network Environments. of SPIE Multimedia Computing and Networking 2000*; San Jose, CA, Jan. 2000.

R. Fielding et al., RFC 2616: Hypertext Transfer Protocol—HTTP/1.1. Jun. 1999.

M. Hearst, "TextTiling: Segmenting into multi-paragraph subtopic passages", *Computational Linguistics*; 23(1) 33-65 (1997).

D. Kristol and L. Montulli. RFC 2109: HTTP State Management Mechanism. (1997).

http://searchenginewatch.com/reports/npd.html, NPD search and portal survey.

Jesse. Berst, "Why you're craving an Internet appliance", *ZDNet Anchordesk*, Nov. 11, 1999.

* cited by examiner

| USER | WORD ABBREVIATIONS? | IMAGES? | MAX. DOC SIZE | DATE ABBREVIATIONS? |
|---|---|---|---|---|
| 212-803-1234 | YES | NO | 2000 BYTES | YES |
| 203-989-9345 | NO | YES | 16000 BYTES | YES |
| 909-454-5512 | NO | NO | 1492 BYTES | NO |
| 412-309-8882 | YES | YES | 1223 BYTES | NO |

FIG. 7

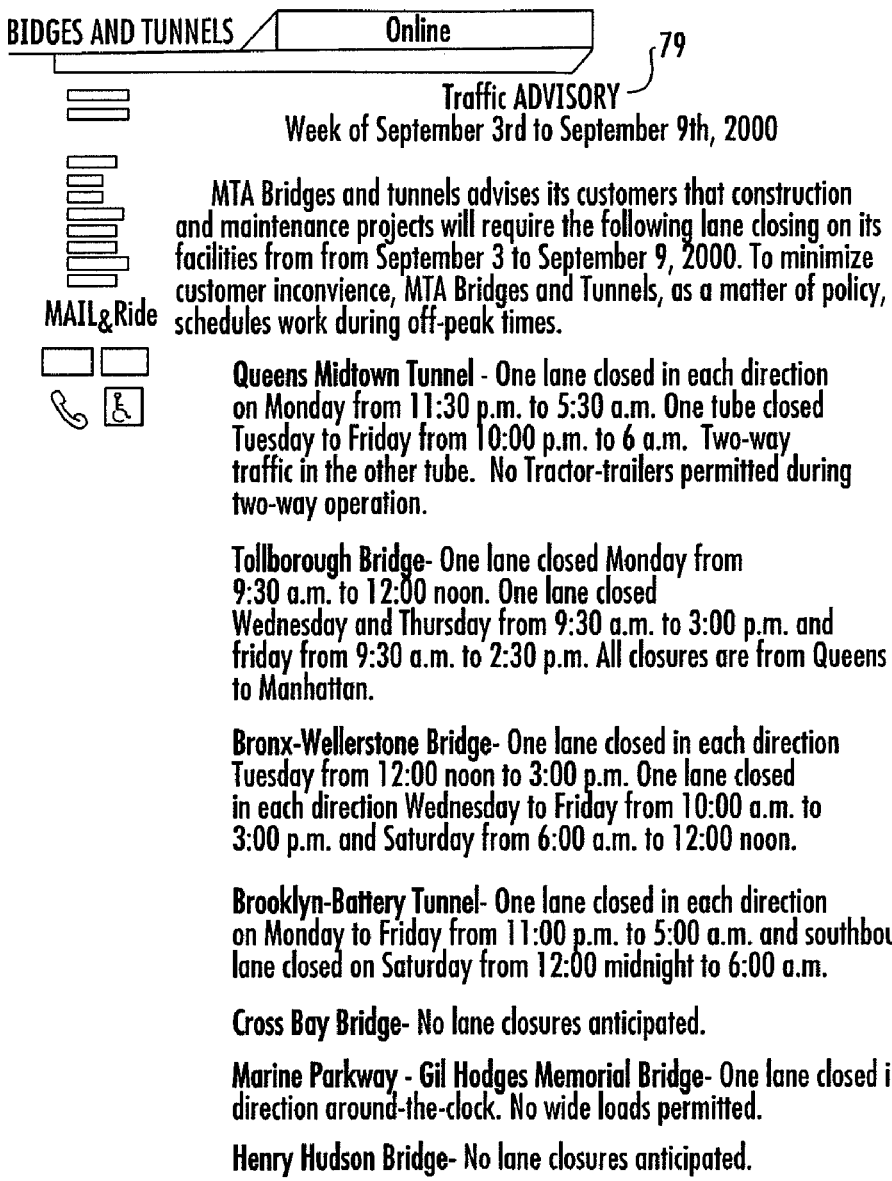
FIG. 14
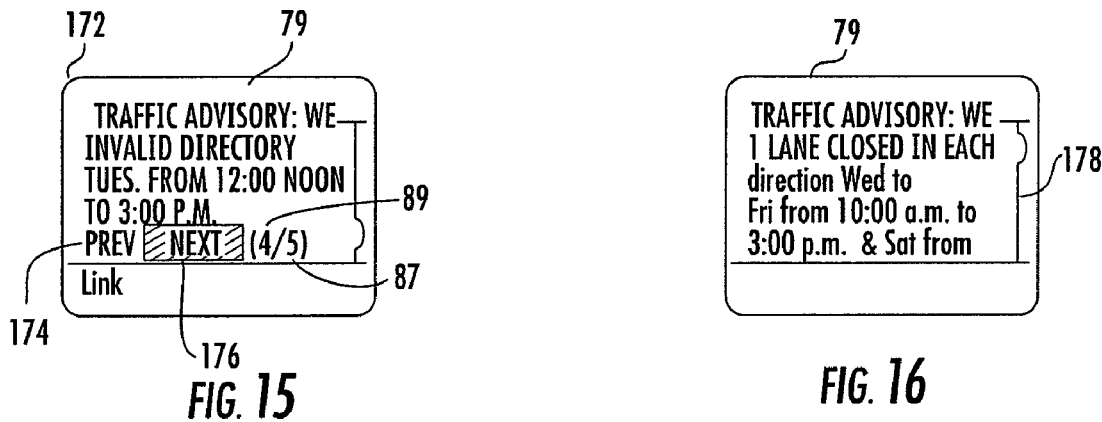
FIG. 15
FIG. 16

CONFIGURABLE TRANSFORMATION OF ELECTRONIC DOCUMENTS

This patent application has the benefit of the filing date of U.S. Provisional Applications No. 60/238,424, filed on Oct. 10, 2000, and No. 60/235,551, filed on Sep. 27, 2000, both incorporated by reference.

BACKGROUND

This invention relates to segmenting, transforming, and viewing electronic documents.

People often access electronic documents such as web pages, text files, email, and enterprise (proprietary corporate) data using desktop or laptop computers that have display screens that are larger than 10 inches diagonally and using connections to the Internet that have a communication rate of at least 28.8 kbps. Electronic documents are typically designed for transmission to and rendering on such devices.

Internet-enabled devices like mobile phones, hand-held devices (PDAs), pagers, set-top boxes, and dashboard-mounted microbrowsers often have smaller screen sizes, (e.g., as little as two or three inches diagonally across), relatively low communication rates on wireless networks, and small memories. Some of these devices cannot render any part of a document whose size exceeds a fixed limit, while others may truncate a document after a prescribed length. Accessing electronic documents (which often contain many paragraphs of text, complex images, and even rich media content) can be unwieldy or impossible using these devices.

Automatic content transformation systems convert electronic documents originally designed for transmission to and rendering on large-screen devices into versions suitable for transmission to and rendering on small-display, less powerful devices such as mobile phones. See, for example, Wei-Ying Ma, Ilja Bedner, Grace Chang, Allan Kuchinsky, and HongJiang Zhang. *A Framework for Adaptive Content Delivery in Heterogeneous Network Environments. of SPIE Multimedia Computing and Networking* 2000. San Jose, Calif., January, 2000.

SUMMARY

In general, in one aspect, the invention features a method that includes altering portions of a text of an original version of a digital document to produce a revised version of the digital document in which the text is shorter than the text of the original document, receiving over a communication channel a request for the digital document from a device connected to the channel, and transmitting the revised version over the communication channel in response to the request.

Implementations of the invention include one or more of the following features. The altering includes reducing the size of an image included in the original document, for example, by image compression, resampling, or conversion from color to black-and-white. The altering of portions of the text includes applying more than one transformation selectively to the text. Transformations to be applied to the text as part of the altering step are selected based on preferences associated with the device. The preferences are associated with the device based on a unique identifier of the device. The preferences are stored in advance of the request for a document. The preferences are stored in a database associated with a server. The preferences are indicated by the user through the interface of the device. The preferences are indicated by the user through the interface of a device other than the device from which the request for the digital document is made. The preferences are indicated on a form provided from a server. The preferences are stored for each device from which requests for documents may be received. The preferences are stored for each type of device from which requests for documents may be received. The preferences are stored on the device using a cookie mechanism. The altering depends on the type of the device. Information is received from the device identifying the type of device. The altering is performed at a proxy server or at an origin server. The device includes a device that is not configured to display the entire document at one time. The device includes a personal digital assistance, a hand-held device, or a mobile phone. The altering includes date compression, word abbreviation, or image suppression of images included in the original document. The digital document includes a web page. The method includes segmenting the digital document into subdocuments, and transmitting fewer than all of the segments in response to the request.

In general, in another aspect, the invention features a method that includes maintaining a database that defines preferences associated with different client devices with respect to preferred alterations to be performed on full web pages requested by client devices that are not configured to display full web pages, the alterations making the documents more suitable for display on the client devices.

In general, in another aspect, the invention features a method that includes obtaining from a client device information about preferences with respect to preferred alterations to be performed on full documents requested by a client device that is not configured to display the full documents, and associating the preferences with the client device in a database.

In general, in another aspect, the invention features a method that includes creating content for web pages to be served to types of client devices that are not configured to display full web pages, and storing information about transformations that are to be made to the full web pages to make them suitable for display on the client devices. The stored information associating each of the types of devices with transformations to be made to full web pages requested by that type of device.

Other advantages and features will become apparent from the following description, and from the claims.

DESCRIPTION (FIG. 1 shows a document transforming and serving system.

FIG. 7 shows a database.

FIG. 12 shows a wireless/wired communication system.

FIG. 14 shows a web page.

FIGS. 15 and 16 show small-screen displays of portions of a web page.

In various implementations of the invention, electronic documents are segmented and transformed before being served through low bandwidth communication channels for viewing on user devices that have small displays and/or small memories. We discuss the segmentation feature first and then the transformation feature.

Segmentation

Figure 1:
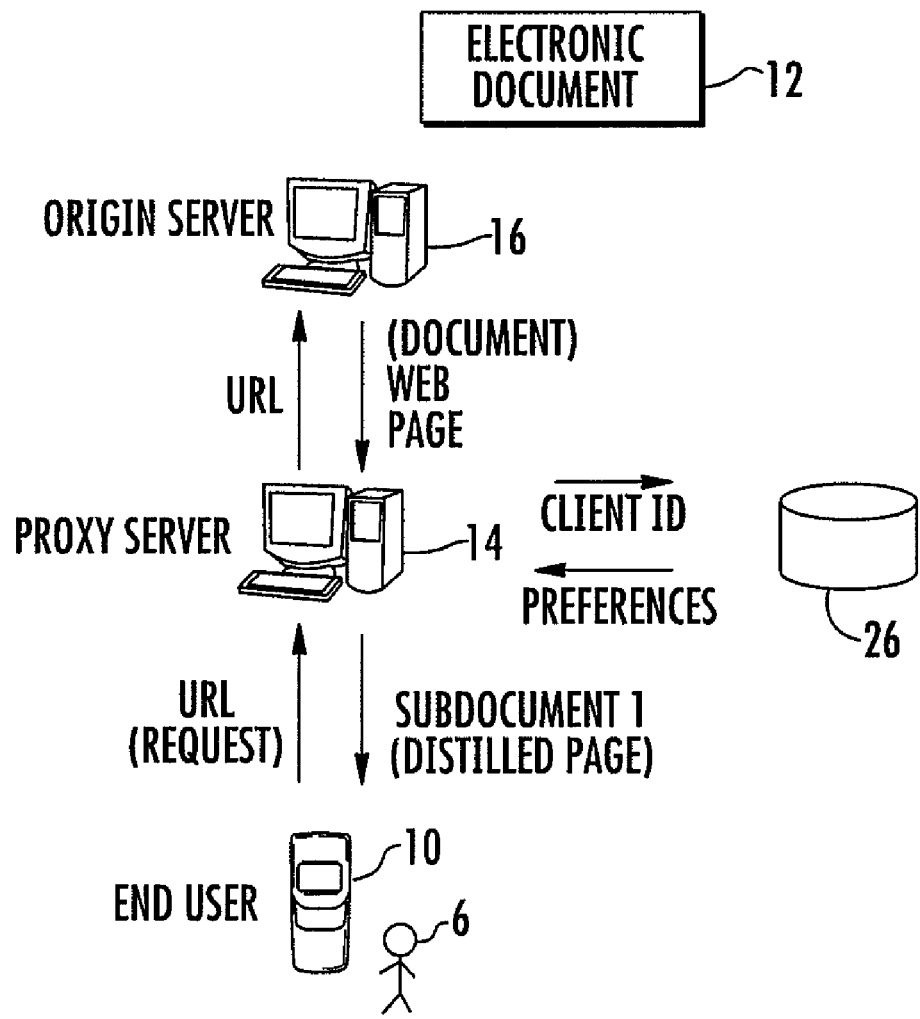

At a high level, as shown in FIG. 1, when a user of an Internet-enabled device 10 (a WAP-enabled mobile phone, for example) requests an electronic document 12 (e.g., a web page, an email, a text file, or a document in a proprietary format or markup language), the user's request, expressed in a URL, eventually makes its way to a proxy server 14. The proxy server then requests the document from an origin server 16 using the URL. The origin server is a computer on the Internet responsible for the document. After receiving the document from the origin server in the form of a web page, the proxy server breaks (segments) the document into subdocuments. The proxy server transmits the first of these subdocuments 1 to the client as a web page. The segmenting of the document need not be done in the proxy server but can be done in other places in the network, as described later.

Figure 2:
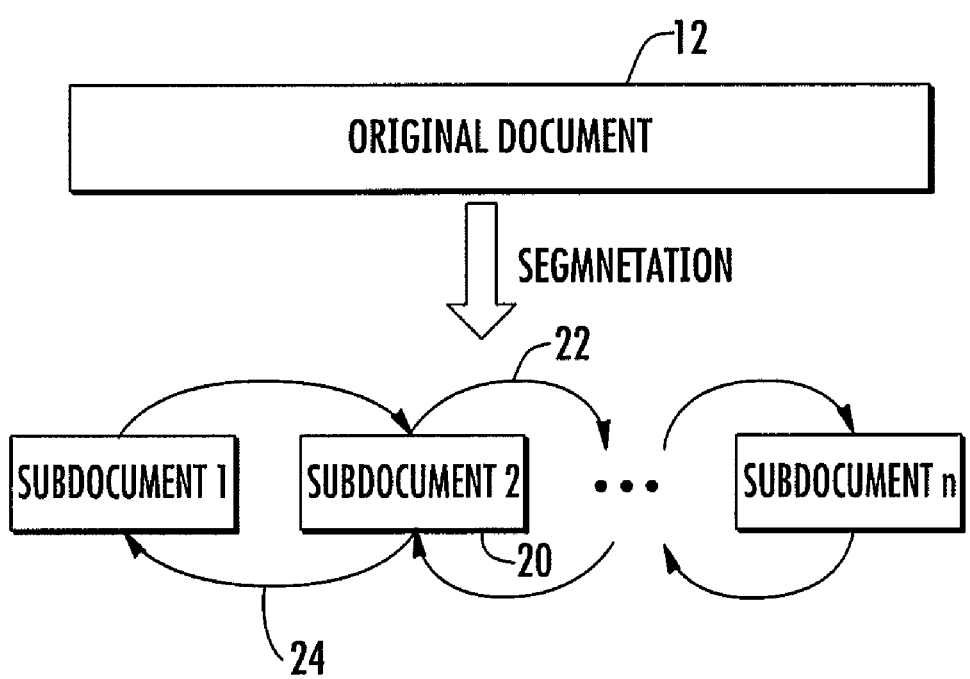
FIG. 2 shows a document.

As shown in FIG. 2, each of the subdocuments 20 delivered by the proxy server to the client contains hyperlinks 22, 24 to the next and previous (each where applicable) subdocuments in the series. The hyperlinks are displayed to the user. If the user selects a forward-pointing (or backward-pointing) hyperlink from a subdocument, that request is transmitted to the proxy server, which responds with the next (or previous) subdocument.

Figure 3:
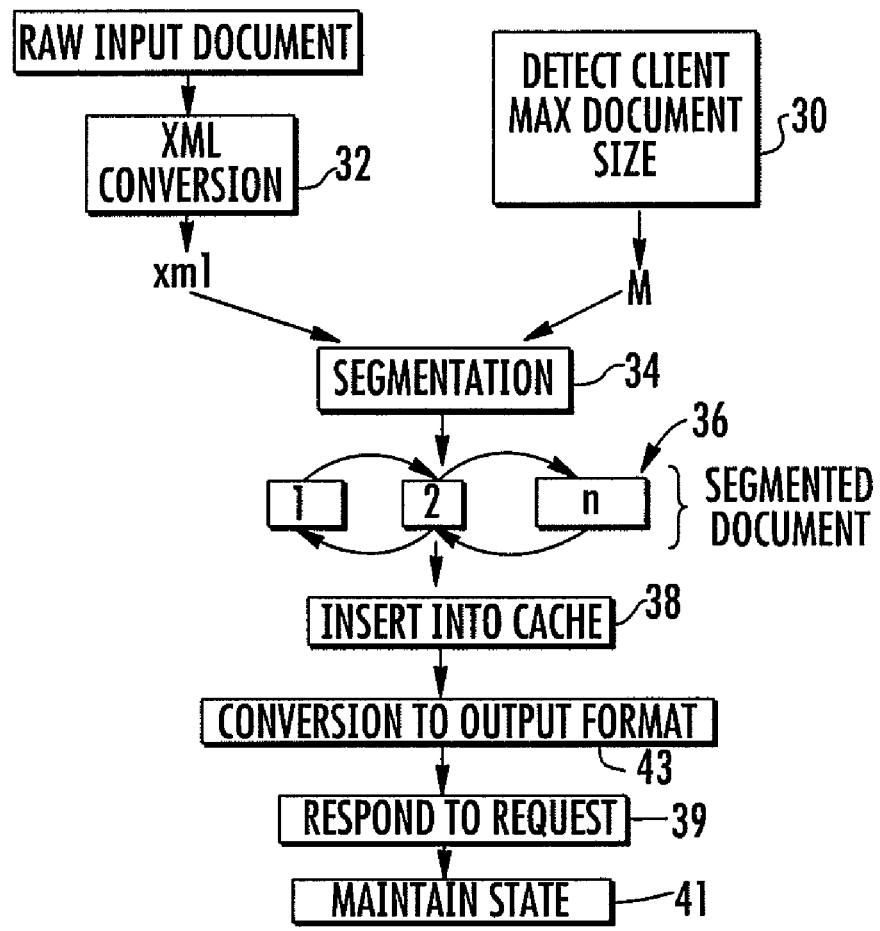
FIG. 3 shows a flow diagram.

As shown in FIG. 3, the first step of the segmentation process is to determine (30) the maximum document size permissible by the client device. If the client-server communication adheres to the HTTP protocol standards as described in RFC2616 (R. Fielding et al., RFC 2616: Hypertext Transfer Protocol—HTTP/1.1. June, 1999.http://www.w3.org/Protocols/rfc2616/rfc2616.txt.), the client advertises information about itself to the proxy server within the header information sent in the HTTP request. The server can use, for instance, the value of the USER-AGENT field to determine the type of microbrowser installed on the client device and, from this information, determine the maximum document size by consulting a table listing the maximum document size for all known devices.

We will denote the length of the original document by N. One can measure length by the size of the document (including markup) in bytes. We denote the maximum permissible length of a document allowed by the client as M. Clearly, any segmentation algorithm that respects the client-imposed maximum length of M must generate from a length-N document at least ceil(N/M) segments.

Figure 4:
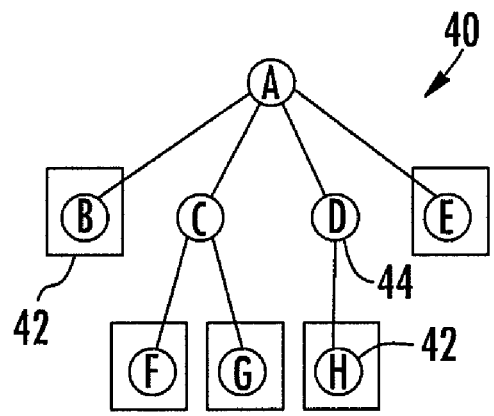
FIGS. 4 and 5 show document hierarchies.

The next step of the segmentation process is to convert the input document into XML (32), a markup language whose tags imply a hierarchical tree structure on the document. An example of such a tree structure is shown in FIG. 4. Conversion to XML from many different source formats, including HTML, can be done using existing software packages.

Figure 5:
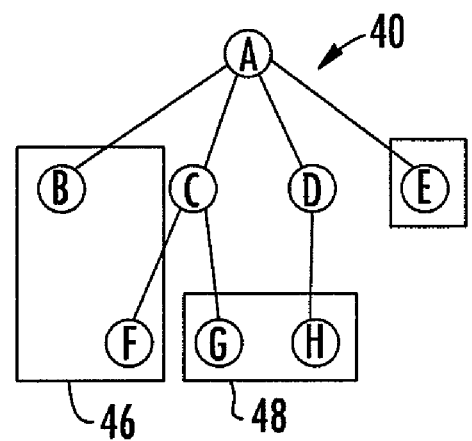

As shown in FIG. 4, the third step is to apply a procedure to divide (34) the XML tree 40 into segments, each of whose length is not greater than M. The leaves 42 of the tree represent elements of the original document—text blocks, images, and so on. Internal nodes 44 of the tree represent structural and markup information—markers denoting paragraphs, tables, hyperlinked text, regions of bold text, and so on. One strategy for accomplishing the segmentation task is to use an agglomerative, bottom-up leaf-clustering algorithm. The leaf-clustering approach begins by placing each leaf in its own segment (as shown in FIG. 4) and then iteratively merging segments until there exists no adjacent pair of segments that should be merged. FIG. 5 shows the same tree after two merges have occurred, leaving merged segments 46, 48.

Each merging operation generates a new, modified tree, with one fewer segments. Each step considers all adjacent pairs of segments, and merges the pair that is optimal according to a scoring function defined on candidate merges. An example scoring function is described below. When the algorithm terminates, the final segments represent partitions of the original XML tree.

Scoring Function

In one example scoring function, a lower score represents a more desirable merge. (In this context, one can think of "score" of a merge as the cost of performing the merge.) In this example, the score of merging segments x and y is related to the following quantities:

1. The size of the segments: The scoring function should favor merging smaller segments, rather than larger ones. Let |x| denote the number of bytes in segment x. All else being equal, if |x|=100, |y|=150, and |z|=25, then a good scoring function causes score(x,z)<score(y,z)<score(x,y). The effect of this criterion, in practice, is to balance the sizes of the resulting partitions.

2. The familial proximity of the segments: All else being equal, if segments x and y have a common parent z, then they comprise a more desirable merge than if they are related only through a grandparent (or more remote ancestor) node. That two segments are related only through a distant ancestor is less compelling evidence that the segments belong together than if they are related through a less distant ancestor.

3. The node replication required by the merge: Internal nodes may have to be replicated when converting segments into well-formed documents. Of course, in partitioning an original document into subdocuments, one would like to minimize redundancy in the resulting subdocuments.

Defining by d(x,y) the least number of nodes one must travel through the tree from segment x to segment y, and by r(x,y) the amount of node replication required by merging segments x and y. A general candidate scoring function is then $$\text{score}(x,y) = A(|x|+|y|) + B(d(x,y)) + C(r(x,y)),$$

where A and B and C are functions (for example, real coefficients) which can be set by the user.

For example:

Algorithm 1: Agglomerative Segmentation of an XML Document

Input: D: XML document

M: maximum permissible subdocument length

Output: D': XML document with no less than ceil(N/M) leaves, each with a size no larger than M.

1. Assign each leaf in D to its own segment
2. Score all adjacent pairs of segments $x_1$, $x_2$ in D with score $(x_1, x_2)$
3. Let x,y be the segment pair for which score(x,y) is minimal
4. If merging x and y would create a segment of size >M, then end
5. Merge segments x and y
6. Go to step 1

Other strategies could be used for scoring candidate segment merges.

The algorithm just described takes no account of the actual lexical content of the document when deciding how to segment. Other examples use a criterion that takes into account the identities of the words contained in each segment and favors locations where a break does not appear to disrupt the flow of information. To accomplish this, a system must examine the words contained in the two segments under consideration for merging to determine if they pertain to the same topic. Such "text segmentation" issues are addressed, for instance, by automatic computer programs such as the one described in M. Hearst, *TextTiling: Segmenting text into multi-paragraph subtopic passages*. Computational Linguistics 23(1) 33–65, 1997. TextTiling is an algorithm designed to find optimal locations to place dividers within text sources.

Returning to FIG. 3, the next step is to convert the segments of the final tree into individual, well-formed XML documents (36). Doing so may require replication of nodes. For instance, in FIG. 5, merging leaves B and F has the effect of separating the siblings F and G. This means that when converting the first and second segments of the tree on the right into well-formed documents, each document must contain an instance of node C. In other words, node C is duplicated in the set of resulting subdocuments. The duplication disadvantage would have been more severe if nodes F and G were related not by a common parent, but by a common grandparent, because then both the parent and grandparent nodes would have to be replicated in both segments.

After having computed a segmentation for the source document, the proxy server stores the individual subdocuments in a cache or database (38) to expedite future interaction with the user. When the user follows a hyperlink on the first subdocument to access the next subdocument in the sequence, the request is forwarded to the proxy server, which responds (39) with the appropriate subdocument, now stored in its cache.

If the proxy server is responsible for handling requests from many different clients, the proxy server maintains state (41) for each client to track which document the client is traversing and the constituent subdocuments of that document. As before, the proxy server can use the HTTP header information—this time to determine a unique identification (IP address, for example, or a phone number for a mobile phone) for the client device, and use this code as a key in its internal database, which associates a state with each user. A sample excerpt from such a database appears below:

| User | State |
| --- | --- |
| 12345 | [subdoc 1] [subdoc 2] [subdoc 3] . . . [subdoc 8] |
| 45557 | [subdoc 1] [subdoc 2] |
| 98132 | [subdoc 1] [subdoc 2] [subdoc 3] . . . [subdoc 6] |

Many client devices cannot process documents written in XML and can process only documents written in another markup language, such as text, HTML, WML or HDML. Translation of the XML subdocuments to the other format (43) could be done at the proxy server by any available translator.

The agglomerative segmentation algorithm (Algorithm 1, above) is performed only once per source document, at the time the user first requests the document. As the user traverses the subdocuments comprising the source document, the computational burden for the proxy server is minimal; all that is required is to deliver the appropriate, already-stored subdocument.

Once the segmentation of a document into subdocuments has been achieved, it is possible to use the subdocuments in a variety of ways other than simply serving them in the order in which they appear in the original document.

Figure 17:
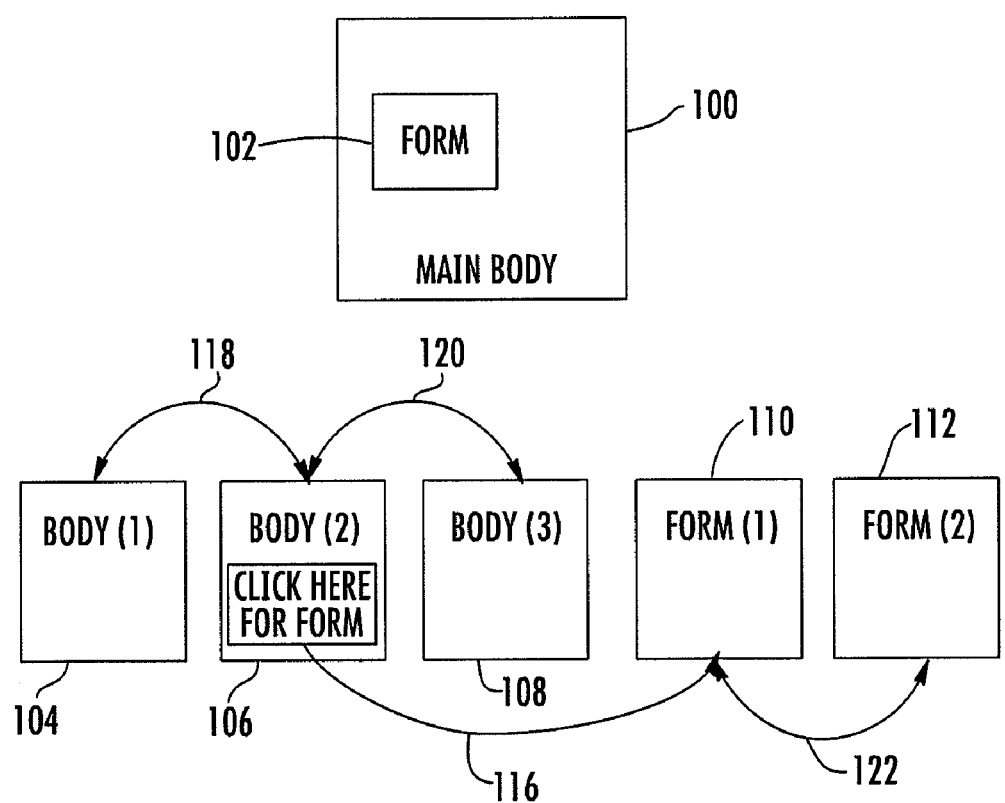
FIG. 17 shows isolating subdocuments for separate use.)

For example, as shown in FIG. 17, an original HTLM document 100 may contain a form 102. In order to make the user's interaction with the page sensible, it may be useful to separate the form from the rest of the page and replace it with a link in one of the subdocuments. Then the user can invoke the link on his local device to have the form presented to him. If he prefers not to see or use the form, he can proceed to navigate through the other subdocuments as discussed earlier without ever getting the form.

For this purpose, the documented can be segmented into subdocuments 104, 106, and 108 that represent parts of the main body of the document and subdocuments 110, 112 that represent portions of the form 102. One of the subdocuments 106 contains an icon 114 that represents a link 116 to the form. Other links 118, 120, and 122 permit navigation among the subdocuments as described earlier.

Transformation

The content of the subdocuments that are served to the user devices can be automatically transformed in ways that reduce the amount of data that must be communicated and displayed without rendering the information represented by the data unusable. Users can customize this automatic transformation of electronic documents by expressing their preferences about desired results of the transformation. Their preferences are stored for later use in automatic customized transformation of requested documents.

For example, a user may wish to have words in original documents abbreviated when viewing the documents on a size-constrained display. Other users may find the abbreviation of words distracting and may be willing to accept the longer documents that result when abbreviations are not used. These preferences can be expressed and stored and then used to control the later transformation of actual documents.

We discuss steps in transforming the documents first and then the process of soliciting user preferences.

Transforming Documents

Figure 6:
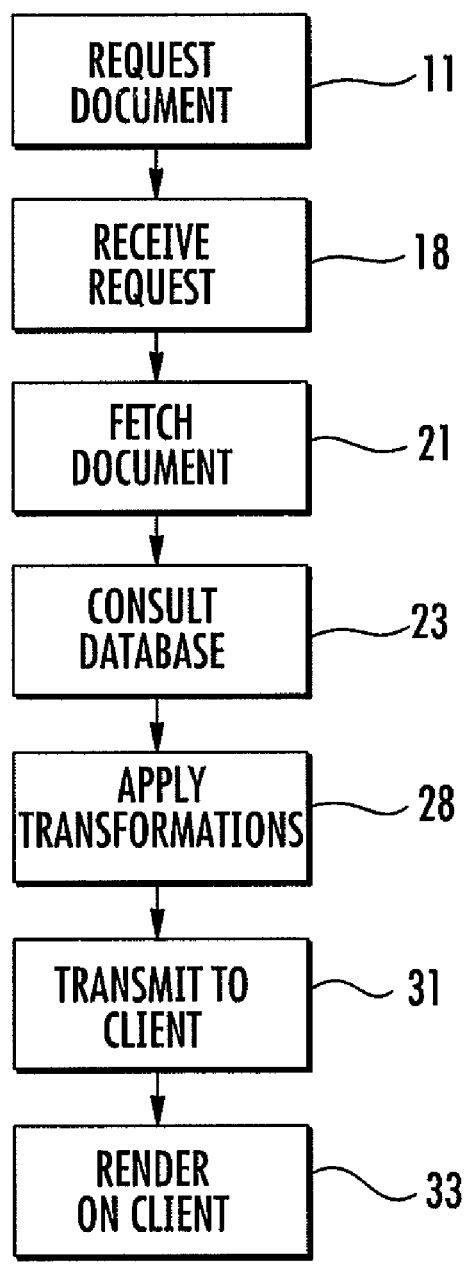
FIG. 6 shows a process for document transformation.

As shown in FIGS. 1 and 6, and as explained earlier, when the user 6 of the device 10 requests (11) the document 12 (e.g., by entering a URL into a browser running on the device, selecting from a bookmark already stored in the browser, or selecting a link from a hypertext document previously loaded into the browser), the proxy server receives the request (18) and fetches (21) the document from the origin server.

After receiving the document from the origin server, the proxy computer consults (23) a database 26 of client preferences to determine the appropriate parameters for the transformation process for the device 8 for the user who is making the request. The proxy computer then applies (28) the transformations to the document to tailor it for transmission to (31) and rendering (33) on the client device.

The HTTP header in which the client device advertises information to the proxy server about itself can include two relevant pieces of information:

1. A unique identifier for the device: For example, for wireless Internet devices equipped with a microbrowser distributed by Phone.com, the HTTP header variable X-UP-SUBNO is bound to a unique identifier for the device.

2. The device type: For example, the HTTP header variable USER-AGENT is bound to a string that describes the type of browser software installed on the device.

When document transformation occurs, the proxy computer has already obtained the unique ID and can use it as a key to look up, in the database, a set of preferences associated with the user.

FIG. 7 shows an example of rows in a fictitious database. Each row 45 identifies a device by the device's telephone number. The row associates user preferences (four different ones in the case of FIG. 7) with the identified device. In this case, the telephone number (e.g., of a mobile phone) is the unique ID that serves as the key for the records in the database.

Having consulted the database to determine the appropriate preference values for this user, the proxy computer can use these values to guide its transformation process. Thus, as shown in FIGS. 1 and 4, the inputs to the transformation process are a source document (in HTML, for instance) and a set of user preference values (one row in the database from FIG. 6)

Figure 8:
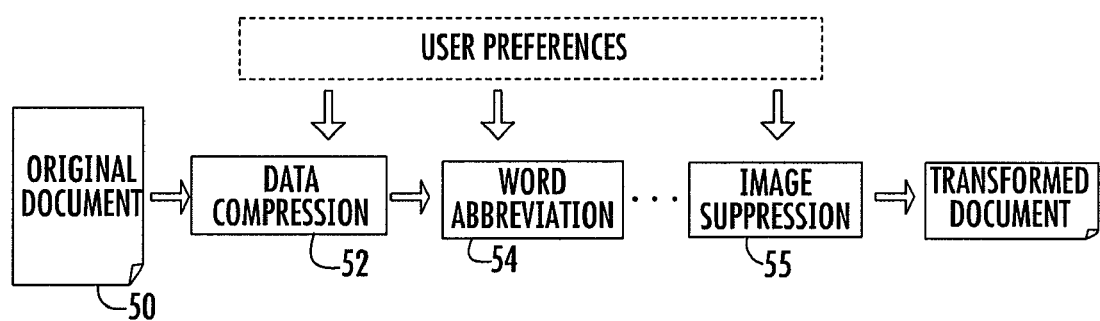
FIG. 8 shows a document transformation system.

As shown in FIG. 8, document transformation includes a sequence of operations, such as date compression 52, word abbreviation 54, and image suppression 55, in converting an original document to a form more suitable for rendering on a small-display device. At every step, the preferences for the target device are used to configure the transformation operations. For instance, the client-specific preferences could indicate that word abbreviation should be suppressed, or that image suppression 55 should only be applied to images exceeding a specified size.

In addition to being suppressed, images can be subjected to other kinds of transformations to reduce their size. For example, images may be compressed, downsampled, or converted from color to black and white.

Examples of user-configurable parameters include the following:

Abbreviations

To reduce the space required to display a document, words may be abbreviated. There are many strategies for compressing words, such as truncating long words, abbreviating common suffices ("national" becomes "nat'l"), removing vowels or using a somewhat more sophisticated procedure like the Soundex algorithm (Margaret K. Odell and Robert C. Russell, U.S. Pat. No. 1,261,167 (1918) and U.S. Pat. No. 1,435,663 (1922).). The corresponding user-configurable parameter would be a Boolean value indicating whether the user wishes to enable or disable abbreviations. Enabling abbreviations reduces the length of the resulting document, but may also obfuscate the meaning of the document.

Suppression of Images

Many small-screen mobile devices are incapable of rendering bitmapped images. Even when possible, rendering of large images may require lengthy transmission times. Bitmapped images are likely to degrade in quality when rendered on low-resolution screens. For these reasons, users may control whether and which kinds of bitmapped images are rendered on their devices. The corresponding user-configurable parameter in this case could be, for instance, a Boolean value (render or do not render) or a maximum acceptable size in pixels for the source image.

Entity Compression

A transformation system can employ a natural language parser to detect and rewrite certain classes of strings into shorter forms. For instance, a parser could detect and rewrite dates into a shorter form, so that, for instance, "Dec. 12, 1984" becomes "12/12/84", "February 4" becomes "2/4", and "The seventh of August" becomes "8/7".

The corresponding user-selectable parameter value could be a Boolean value (compress or do not compress), or it could take on one of three values: do not compress, compress into month/day/year format, or compress into day/month/year format.

Similarly, a transformation system could parse and compress numeric quantities, so that (for instance) "seventeen" becomes "17" and "ten gigabytes" becomes "10 GB."

A wide variety of other transformation could be devised for a wide variety of types of documents.

Specifying and Storing Per-Device Preferences

We return now to discuss two example methods for acquiring preferences from device users and for associating these preferences with specific client devices.

Entering Preferences from the Small-display Device

Figure 9:
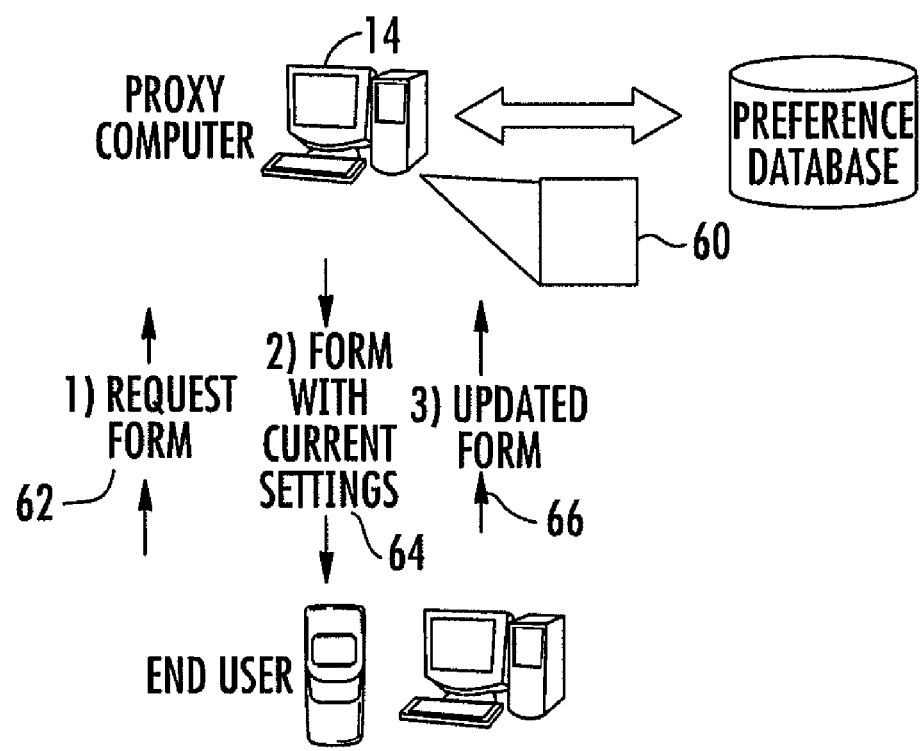
FIG. 9 shows a process for expressing preferences.

A user can enter and maintain preferences by visiting the proxy computer using the same small-display device he uses for Internet access. As shown in FIG. 9, the proxy computer could store a hypertext form 60 that users of small-display devices retrieve and fill in according to their preferences. Upon receiving an HTTP request 62 from a client device, the proxy computer will automatically (using the HTTP protocol) obtain the unique identifier for the client device. The proxy computer then transmits to the user a form 64 that contains a set of preferences. If the client device already has an associated entry in the database, the current value for each parameter can be displayed in the form; otherwise, a default value will be displayed. The user may change parameters on this form as he sees fit and then submit the form back 66 to the proxy computer, which stores the updated values in the database in the record associated with that client device.

Entering Preferences from a Conventional Computer

Alternatively, the user can visit the same URL using a conventional web browser on a desktop or laptop computer. The proxy computer will be unable to determine automatically from the HTTP header information which device to associate the preferences with. The user must explicitly specify the unique identifier—phone number, for instance—of the device for which the user wishes to set the preferences.

Figure 10:
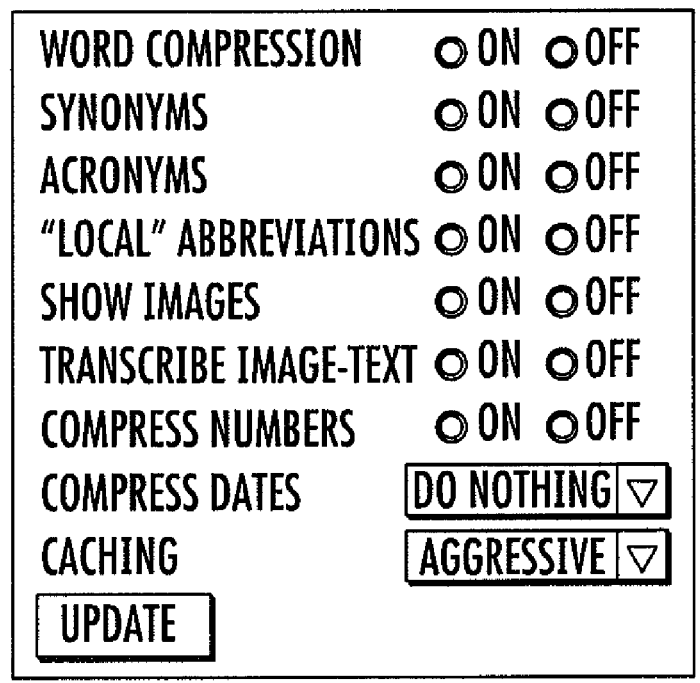
FIG. 10 shows a preference form.
Figure 11:
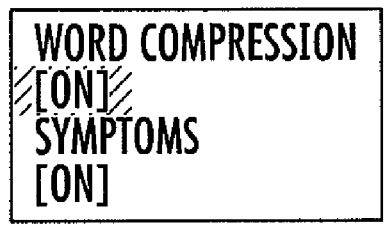
FIGS. 11 and 12 show preference forms.

FIG. 10 shows an example of the form appearing on a conventional HTML-based desktop web browser. FIG. 11 shows the first screen of the corresponding page appearing on a four-line mobile phone display (A user must scroll down to see the rest of the options.)

Specifying and Storing Per-Type Preferences

In the previous discussion, the user is a person accessing a remotely-stored document using a small-screen device, and a proxy computer (which performs the transformations) mediates between the user's device and the Internet as a whole.

Another setting in which configurable transformations are useful is for an individual or institution to exercise control over the appearance on small-display devices of documents that it generates. To that end, the origin server responsible for storing and transmitting the data can be equipped with automatic content transformation software (using a module or "plug-in" for the web server software). The origin server host can then configure and control the transformation software as desired.

The origin server may also offer to an author of content an ability to configure transformations once for any user retrieving documents from that server for a particular type of client device. In other words, instead of offering the end user the ability to customize the transformations, one can instead offer this ability to the person or institution that authored the content. This scenario is relevant when the content provider desires strict control over the appearance of their content on small-display devices.

Rather than storing a database of user (individual device) preferences, then, the origin server stores only a single set of parameter values for the transformation for each type of device. The information flow from user to origin server is thus:

1. User requests a document from origin server.

2. Origin server receives the request and information on the type of client device making the request.

3. Origin server consults the transformation parameters appropriate for that device in processing the requested document.

4. Origin server delivers the transformed document to the client device.

An example of the entries in the database that are used for step 3 is shown below:

| Device type | Word abbreviations? | Images? | Max. doc size | Date abbrevs? |
|---|---|---|---|---|
| Samsung SCH-8500 | yes | no | 2000 bytes | yes |
| Motorola StarTAC | no | yes | 16000 bytes | yes |
| Palm VII | no | no | 1492 bytes | no |
| 412-309-8882 | yes | yes | 1223 bytes | no |

The previous section described a method for end users to specify and store preferences, to be associated with a single device. This section described a method for content creators to configure the transformation of documents delivered from their origin server. These two scenarios are not incompatible. Imagine that an end user requests a document X from an origin server Y. Imagine further that the end user has registered a set of preferences for his transformations, and that there exists on the origin server a separate set of preferences for documents delivered from that origin server. The document will be transformed first according to the preferences in the origin server, and then according to the end user's preferences. In this scenario, the end user's preferences sometimes cannot be honored. For instance, if the end user does not want words abbreviated, but the preferences for the origin server specify that words are to be abbreviated, then the end user will receive, despite his preferences, a document containing abbreviated words.

Storing Preferences on the Client Device

An alternative strategy for associating preferences with devices is to use the HTTP "cookie" state mechanism (D. Kristol and L. Montulli. RFC 2109: HTTP State Management Mechanism. (1997). http://www.w3.org/Protocols/rfc2109/rfc2109.txt). In this case, the preference information is not stored on a database remote from the client device, but rather on the device itself. The information flow of per-device preference information in this setting is as follows:

1. A user of a small-display device submits a request to the proxy computer for the preferences form document. The form document is transmitted from the proxy computer to the device.

2. The user fills in his preferences and submits the filled-in form back to the proxy computer.

3. The proxy computer responds with a confirmation document and also transmits, in the HTTP header information to the client device, a cookie containing that user's preferences. For example, the cookie might look like Set-Cookie: PREFS="abbrevs:yes images:no dates:yes . . . "; path=/; expires=04-Sep-01 23:12:40 GMT 4. The client device stores this cookie as persistent state.

5. When a user of the client device subsequently requests a document from the proxy computer, the device also transmits to the proxy computer the cookie containing the stored preferences:

Cookie: PREFS="abbrevs:yes images:no dates:yes . . . ";

6. Equipped with the preferences for this client, the proxy computer applies these preferences in transforming the requested document. If the client device did not transmit a cookie, either because the cookie expired or was erased, the proxy computer applies a default transformation.

Applications

Figure 12:
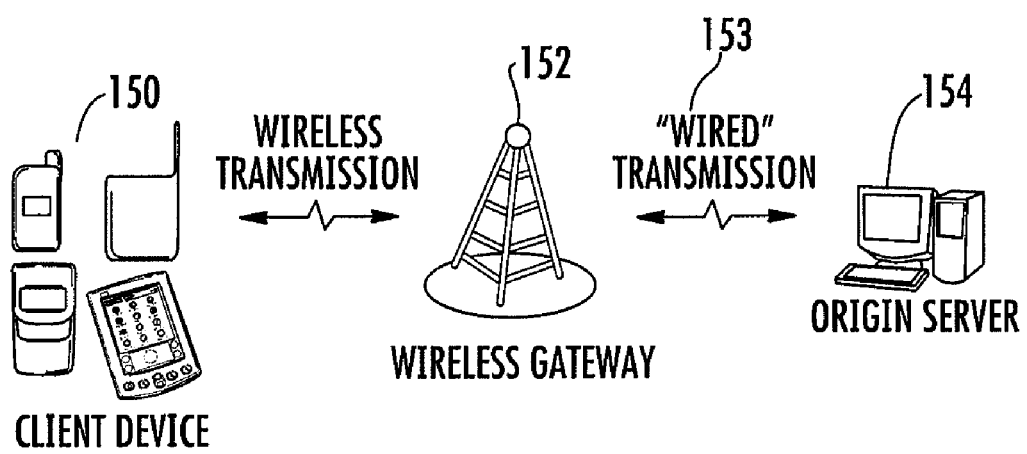

As shown in FIG. 12, communication between wireless devices 150 and the "wired" Internet 153 typically occur through a gateway 152, which mediates between the wired and wireless worlds. For instance, a request for a document by a user of a WAP-capable device is transmitted to the wireless gateway, which forwards the request to the origin server 154 (on the Internet) responsible (according to the DNS protocol) for the requested document.

If the requested document has been designed specifically for the client device and written in the markup language accepted by the device—sometimes HTML, but more often another markup language such as WML, HDML, or a proprietary language—content transformation isn't necessary. Because different wireless data devices have different capabilities, a content creator would have to create a separate version not only for each target markup language but also for every possible target device. The content provider needs also to understand how to detect the type of client device and create a document optimally formatted for that client.

Figure 13:
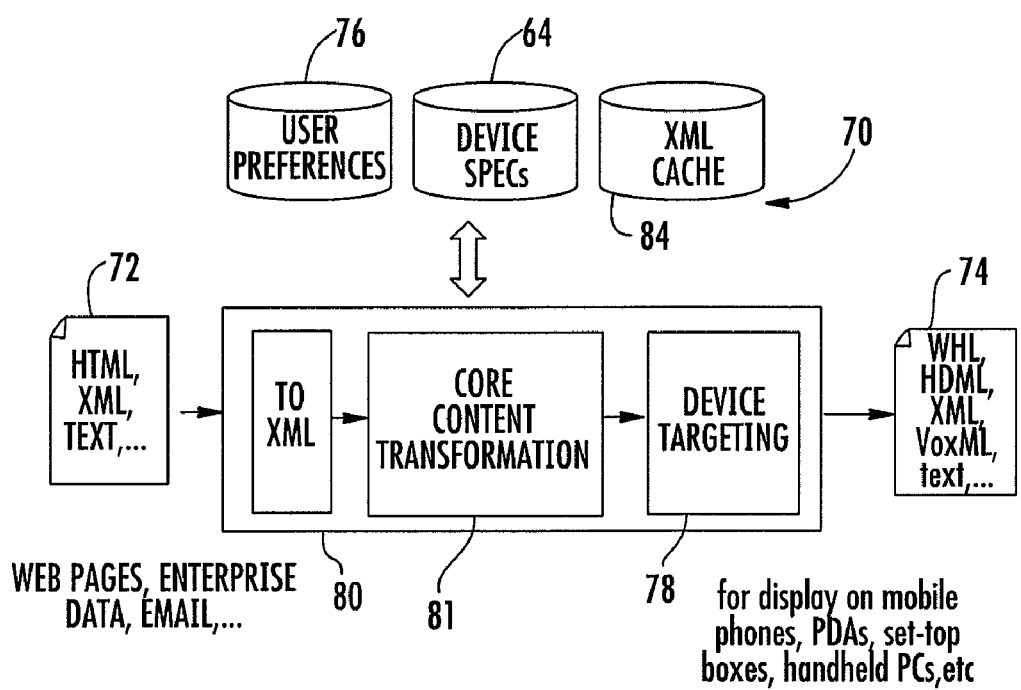
FIG. 13 shows a document transformation system.

As shown in FIG. 13, an automatic content transformation system 70 can automatically compress and reformat documents 72 into formats that are optimal for display on specific target devices. This leaves content creators free to concentrate on writing content rather than on retargeting content for a variety of target devices.

The content transformation system intercepts requests from non-traditional client devices, customizes the requested documents for display on the target device 78, and transmits the transformed documents 74 to the client. The content transformation system employs user preferences 76 and device specifications 64 to guide the document transformation process.

If the requested page 72 has been designed specifically for the client device making the request, content transformation isn't necessary. But designing documents for wireless devices is no simple matter. The document must be written in the markup language accepted by the device-sometimes HTML, but more often another markup language such as WML, HDML, or a proprietary language. Because the hundreds of different wireless data devices each have different capabilities 64, a content creator faces the prospect of creating a separate version not only for each target markup language, but for every possible target device. The content provider also needs to understand how to detect the type of client device and create a document optimally formatted for that client.

By using system 70, which automatically compresses and reformats a document 72 for optimal display on a specific target device, content creators are free to concentrate on their core competency—writing content—and not on retargeting content for a variety of target devices. Once installed, a content transformation system intercepts requests from non-traditional client devices, customizes the requested document for display on the target device, and transmits the transformed document to the client. Content transformation systems can use automatic document segmentation to stage the delivery of large documents to devices incapable of processing large documents in their entirety.

The core content transformation component 81 can include the segmentation process described earlier. The XML cache object 84 is where the per-user subdocuments are stored for the segmentation process.

Content transformation is a server-side technology and can naturally be deployed at various locations in the client-origin server channel, anywhere from the wireless gateway to the origin server that holds the original content. The following table lists a few of the places content transformation is applicable.

| Setting | Explanation | Benefits |
| --- | --- | --- |
| Within a web server | As a plug-in module to Apache and competing web server software, allowing on-the-fly customized transformations to handheld devices. | After installation, the web server can automatically detect requests from wireless clients and generate content optimized for the requesting device. |
| Within a reverse proxy server | Transform all content from a single site or group of sites at a centralized location. | Same as above, but also exploits the proxy cache to centralize the transformation process and reduce server load. |
| Within a proxy server | A resource shared by a community (a company, for instance) | Enables users of the proxy to access the entire Internet with their wireless device. |
| At the wireless gateway | The gateway processes HTTP requests from wireless clients by fetching the requested URL and passing the document through the transformation process before delivering the document to the client device. | Allows all subscribers to that wireless service to access the entire Internet, customized to their device. |
| As stand-alone software | Integrated as part of the web-development process. Web developers can use the software as a rapid prototyping tool, refining the output by hand if desired. | Allows companies to create custom wireless content at a fraction of the cost associated with creating the content entirely by hand. |

FIG. 14 shows an example input document (a full-size web page) that was divided into five subdocuments. FIG. 15 shows the bottom of the fourth subdocument 172, corresponding to the middle of the "Bronx-Whitestone Bridge" section of the original page. The hyperlinks (icons) labeled "prev" 174 and "next" 176 bring a user to the third and fifth subdocuments, respectively, when invoked. FIG. 16 shows the beginning of the fifth subdocument 178, which begins where the fourth leaves off. The user can scroll through the subdocument as needed. In some implementations, as shown, the icons 174, 176 are only displayed when the user has scrolled to the beginning or end of the subdocument. In other examples, the icons could be displayed at all times.

In FIGS. 15 and 16, the numbers and words in the original have been abbreviated ("one" became "1", "and" became "&") and days of the week have been shortened.

The display of each subdocument also includes a display of the heading 79 of the original document. That heading is included in the subdocument when the subdocument is created from the original document. The display also includes an indication of the total number of subdocuments 87 and the position 89 of the current subdocument in the series of subdocuments that make up the original document.

Other implementations are within the scope of the following claims.

For example, in the user interface, the bottom of each subdocument rendered on the target device can contain a graphical status bar showing where the subdocument lies in the set of subdocuments comprising the original document. For instance, ooxoooo could mean "this is the third of seven subdocuments". Moreover, each of the o's in this status bar could be hyperlinked to that subdocument, enabling the user to randomly access different subdocuments in the document. This can be more efficient than proceeding subdocument by subdocument in order.

The invention claimed is:

1. A method comprising:
altering portions of a text of an original version of a digital document to produce a revised version of the digital document in which the text is shorter than the text of the original document, the altering including segmenting the digital document into subdocuments, the altering being done based on a set of at least one preference, the set of at least one preference being associated with a device based on a unique identifier of the device and independent of an association with the digital document,
receiving over a communication channel a request for the digital document from the device, and
transmitting the subdocuments of the revised version over the communication channel in response to the request, wherein at least one of the transmitted subdocuments includes a link to an adjacent subdocument.

2. The method of claim 1 in which altering portions of the text includes applying more than one transformation selectively to the text.

3. The method of claim 1 also including selecting transformations to be applied to the text as part of the altering step, based on preferences associated with the device.

4. The method of claim 3 in which the preferences are stored in advance of the request for a document.

5. The method of claim 3 in which the preferences are stored in a database associated with a server.

6. The method of claim 3 in which the preferences are indicated by the user through the interface of the device.

7. The method of claim 3 in which the preferences are indicated by the user through the interface of a device other than the device from which the request for the digital document is made.

8. The method of claim 3 in which the preferences are indicated on a form provided from a server.

9. The method of claim 3 in which preferences are stored for each device from which requests for documents may be received.

10. The method of claim 3 in which preferences are stored for each type of device from which requests for documents may be received.

11. The method of claim 3 in which the preferences are stored on the device.

12. The method of claim 3 in which the preferences are stored on the device using a cookie mechanism.

13. The method of claim 1 in which the altering depends on the type of the device.

14. The method of claim 13 also including receiving information from the device identifying the type of device.

15. The method of claim 1 in which the altering is performed at a proxy server.

16. The method of claim 1 in which the altering is performed at an origin server.

17. The method of claim 1 in which the device comprises a device that is not configured to display the entire document at one time.

18. The method of claim 17 in which the device comprises a personal digital assistance, a hand-held device, or a telephone.

19. The method of claim 1 in which the altering comprises date compression.

20. The method of claim 1 in which the altering comprises word abbreviation.

21. The method of claim 1 in which the altering comprises reducing the size of an image included in the original document.

22. The method of claim 21 in which the reducing includes image compression, resampling, or conversion from color to black and-white.

23. The method of claim 1 in which the digital document comprises a web page.

24. The method of claim 1 also including transmitting fewer than all of the subdocuments in response to the request.

25. The method of claim 1 in which the digital document comprises an e-mail.

26. The method of claim 1 in which altering portions of a text comprises altering portions of a text based on preferences associated with a device and independent of an association with the digital document.

27. The method of claim 1 in which altering portions of a text comprises altering portions of a text based on preferences related to at least one capability of the device.

28. The method of claim 1 in which altering portions of a text comprises altering portions of a text based on preferences related to at least one capability of the device, and independent of a relation to an ability of a user of the device.

29. The method of claim 1, wherein the segmenting subdocuments comprises:
   determining a maximum document size permissible by the device;
   converting the digital document into a specific markup language document; and
   dividing the specific markup language document into a number of segments of a predetermined length.

30. The method of claim 29, wherein the number of segments is determined by dividing a size of the digital document by the maximum document size permissible by the device.

31. A method comprising:
   maintaining a database that defines a plurality of sets of at least one preference, wherein the sets of at least one preference are associated with different client devices based on corresponding unique identifiers of the client devices and are independent of an association with a web page, wherein the sets of at least one preference define preferred alterations to be performed on full web pages requested by respective client devices that are not configured to display full web pages, the alterations making the documents more suitable for display on the respective client devices, and
   wherein the alterations include segmenting a full webpage into subdocuments for transmitting fewer than all of the subdocuments in response to client device requests, at least one of the transmitted subdocuments including a link to an adjacent subdocument.

32. A method comprising:
   obtaining from a client device a set of at least one preference with respect to preferred alterations to be performed on full documents requested by the client device that is not configured to display the full documents, and
   associating the set of preferences with the client device in a database based on a unique identifier of the client device, the set being associated with the client device independent of an association with a document,
   wherein the alterations include segmenting a full document into subdocuments for transmitting fewer than all of the subdocuments in response to client device requests, at least one of the transmitted subdocuments including a link to an adjacent subdocument.

33. A method comprising:
   creating content for web pages to be served to types of client devices that are not configured to display full web pages, and
   storing a plurality of sets of at least one preference defining at least one transformation that is to be made to the full web pages to make them suitable for display on the client devices, the stored sets of preferences each being associated with a respective device based on a unique identifier of the respective device independent of an association with a web page, and defining at least one transformation to be made to full web pages requested by that respective device,
   wherein the at least one transformation includes segmenting a full web page into subdocuments for transmitting fewer than all of the subdocuments in response to requests from the client devices, at least one of the transmitted subdocuments including a link to an adjacent subdocument.

34. A network entity comprising:
   a processor capable of receiving a set of at least one preference for altering digital documents to be displayed by a device, wherein the set of at least one preference is associated with the device based on a unique identifier of the device and independent of an association with a digital document,
   wherein the processor is capable of altering at least a portion of an original version of a digital document based upon the set of at least one preference to thereby produce a revised version of the digital document, and wherein the processor is capable of producing the revised version of the digital document such that the device is capable of displaying the revised version, and
   wherein altering at least a portion of the original version of the digital document includes segmenting the digital document into a plurality of subdocuments, at least one of the transmitted subdocuments to the device including a link to an adjacent subdocument, the revised version of the digital document including the subdocuments.

35. A network entity according to claim 34, wherein the network entity comprises an origin server, and wherein the processor is capable of transmitting the revised version of the digital document to the device after producing the revised version.

36. A network entity according to claim 34, wherein the processor is capable of receiving the original version of the digital document from an origin server in response to the origin server receiving a request for the digital document to be displayed by a device, the original version of the digital document being independent of an association with a preference for altering at least a portion of the original version to thereby produce the revised version.

37. A network entity according to claim 36, wherein the network entity comprises a proxy server, and wherein the processor is capable of transmitting the revised version of the digital document to the device after producing the revised version.

38. A network entity according to claim 36, wherein the network entity comprises a device, and wherein the processor is capable of driving a display to present the revised version of the digital document after producing the revised version.

39. A network entity according to claim 34, wherein the set of at least one preference is associated with the device based on a unique identifier of the device.

40. A network entity according to claim 34, wherein the set of at least one preference is associated with a type of device and independent of an association with a digital document, and wherein the processor is capable of receiving the set of at least one preference based on the type of device for which the revised version of the digital document is produced.

41. A network entity according to claim 34, wherein the processor is capable of transmitting a portion of the subdocuments to the device, and retaining the remaining portion of the subdocuments, after producing the revised version.

42. A network entity according to claim 41, wherein the processor is capable of segmenting the digital document into a plurality of ordered subdocuments, and wherein at least one of the portion of subdocuments transmitted to the device includes a link to an adajacent subdocument retained by the network entity.

43. A network entity according to claim 41, wherein at least one subdocument transmitted to the device includes the link such that, upon selection of the link, the processor is capable of receiving a request for the adjacent subdocument, and transmitting the adjacent subdocument to the device.

44. A computer program product comprising at least one computer-readable storage medium having computer-readable program code portions stored therein, the computer-readable program code portions comprising:
   a first executable portion for receiving a set of at least one preference for altering digital documents to be displayed by a device, wherein the set of at least one preference is associated with the device based on a unique identifier of the device and independent of an association with a digital document;
   a second executable portion for altering at least a portion of an original version of a digital document based upon the set of at least one preference to thereby produce a revised version of the digital document, wherein the second executable portion is adapted to produce the revised version of the digital document such that the device is capable of displaying the revised version, the second executable portion being adapted to alter at least a portion of the original version of the digital document including segmenting the digital document into a plurality of subdocuments, the revised version of the digital document including the subdocuments; and
   a third executable portion for transmitting a portion of the subdocuments, wherein the at least one of the portion of subdocuments transmitted by the third executable portion to the device includes a link to an adjacent subdocument.

45. A computer program product according to claim 44, wherein the computer program product is adapted for operation by an origin server, and wherein the computer program product further comprises:
   a fourth executable portion for transmitting the revised version of the digital document to the device after producing the revised version.

46. A computer program product according to claim 44, wherein the first, second and third executable portions are adapted for operation by a network entity, and wherein the computer program product further comprises:
   a fourth executable portion for receiving a request for the digital document to be displayed by a device, wherein the fourth executable portion is adapted for operation by an origin server, and wherein the fourth executable portion is adapted to transmitting the original version of the digital document to the network entity, the original version of the digital document being independent of an association with a preference for altering at least a portion of the original version to thereby produce the revised version.

47. A computer program product according to claim 46, wherein the network entity comprises a proxy server, and wherein the computer program product further comprises:
   a fifth executable portion for transmitting the revised version of the digital document to the device after the second executable portion produces the revised version, the fifth executable portion being adapted for operation by the proxy server.

48. A computer program product according to claim 46, wherein the network entity comprises a device, and wherein the computer program product further comprises:
   a fifth executable portion for displaying the revised version of the digital document after the second executable portion produces the revised version, the fifth executable portion being adapted for operation by the device.

49. A computer program product according to claim 44, wherein the set of at least one preference is associated with the device based on a unique identifier of the device.

50. A computer program product according to claim 44, wherein the set of at least one preference is associated with a type of device and independent of an association with a digital document, and wherein the first executable portion is adapted to receive the set of at least one preference based on the type of device for which the revised version of the digital document is produced.

51. A computer program product according to claim 44, wherein the third executable portion is adapted to transmit a portion of the subdocuments to the device, and retain the remaining portion of the subdocuments, after the second executable portion produces the revised version.

52. A computer program product according to claim 51, wherein the third executable portion is adapted to segment the digital document into a plurality of ordered subdocuments, and wherein the at least one of the portion of subdocuments transmitted by the third executable portion to the device includes a link to an adjacent subdocument retained by the network entity.

53. A computer program product according to claim 51, wherein at least one subdocument transmitted by the third executable portion to the device includes the link such that, upon selection of the link, the third executable portion is further capable of receiving a request for the adjacent subdocument, and transmitting the adjacent subdocument to the device.

* * * * *